Patented June 19, 1951

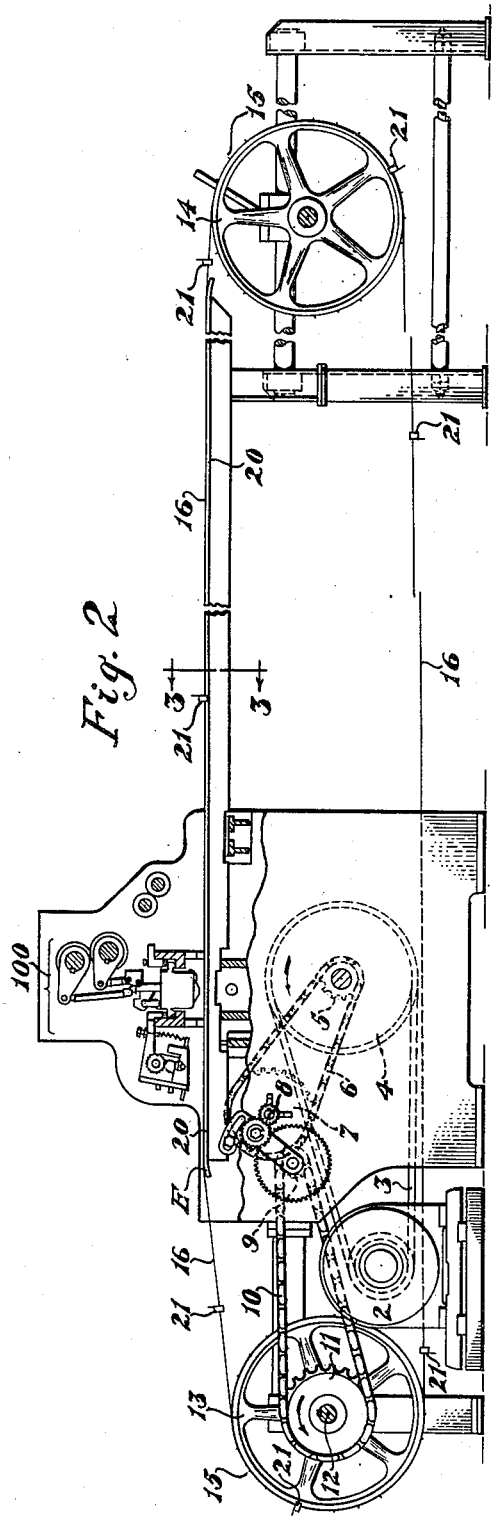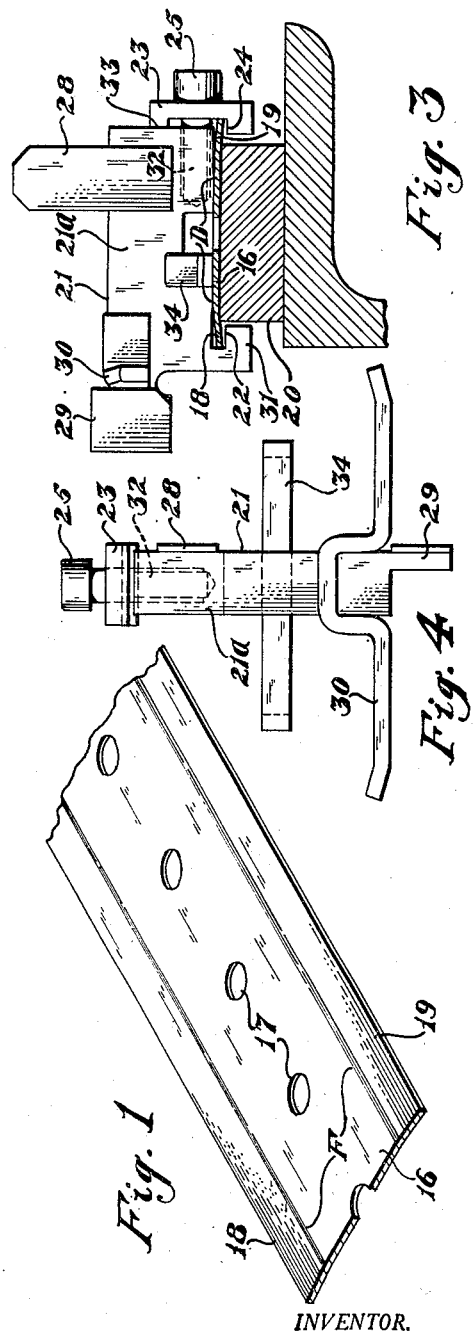
INVENTOR.
Charles O. Riker
BY Blair, Curtis & Hayward

2,557,515

UNITED STATES PATENT OFFICE 2,557,515

CONVEYER FOR WIRED BOX PARTS

Charles O. Riker, Morristown, N. J., assignor to Stapling Machines Co., Rockaway, N. J., a corporation of Delaware Application May 26, 1947, Serial No. 750,461

2 Claims. (Cl. 198—198)

The present invention relates to conveyor mechanism and more particularly to conveying mechanism for conveying box parts (side material and cleats) to stapling mechanism of machines for manufacturing wirebound box and crate blanks.

Conveyor mechanism for such machines has continuous clamping surfaces for adjustably supporting spacer elements which space side material and cleats with respect to each other and convey them to the stapling mechanism. To accommodate the conveyor mechanism to boxes of different lengths, constructions, shapes, etc., the conveyor mechanism is adjustable in length. To accommodate different cleat lengths, and side material widths, the spacer elements are adjustably clamped along the continuous clamping surfaces.

Conveyor mechanism for accomplishing these results is disclosed in United States Patent No. 2,304,510, issued December 8, 1942, to A. L. Rosenmund, and includes two laterally disposed continuous metal bands stretched between drive and idler sprockets. The upper length of each band extending between the sprockets moves forwardly to the stapling mechanism, and the lower length returns therebeneath. Spacer elements acting as spacers and dogs are clamped to each band by opposing clamping members engaging the edges of the band.

Conveyor bands disclosed in the said patent have the advantage of being continuously adjustable in length and of providing continuous clamping edges for the spacer elements. But the conveyor bands are made relatively thin so that they may be flexed around the sprockets, and are, therefore, subject to damage and breakage. The spacer elements are necessarily clamped tightly to the conveyor bands to insure their remaining in proper position on the bands while conveying cleats and side material. Tight clamping of the elements against the conveyor band edges causes the conveyor bands to buckle or bow between the clamped edges, sometimes outwardly against the base of the spacer element and sometimes inwardly away from the base. It was discovered that in operation the bands at the areas of clamping would sometimes change the direction of bow, i. e., snap from an outward bow to an inward bow, and vice versa, and that this action caused the bands to break and fail prematurely. Such snapping of the band from an outward bow to an inward bow also, it was discovered, tended to loosen the clamping action of the associated spacer element.

It is an object of the present invention to provide mechanism for insuring the conveyor band always to bow outwardly at the point of spacer element clamping, and to control the amount of buckling that takes place under the influence of the clamping action, thereby to increase the span of usefulness of the conveyor bands, to hold the elements clamped thereto securely in position, and to eliminate production of distorted box blanks caused by misaligned spacer elements.

Other objects will be in part obvious and in part pointed out as the description proceeds.

In the drawings:

Figure 1 is an isometric view of a fragmentary portion of a box-parts conveyor band embodying the present invention and showing beveled areas adjacent the lateral edges of the conveyor band;

Figure 2 is a left side elevation, partly diagrammatic, of a wirebound box and crate blank manufacturing machine, partially in section and with some parts removed for clearness;

Figure 3 is a fragmentary sectional view taken on the line 3—3 of Figure 2, showing a box-parts spacer element securely clamped about a conveyor band embodying the invention; and Figure 4 is a top plan view of the box-parts spacer element of Figure 3.

Referring to Figure 2, a conveyor band arranged as described in the United States Patent 2,304,510, is shown at 16. (It is understood that there are at least two laterally transversely aligned conveyor bands for each machine.) Each band is stretched between and trained about a drive sprocket 13 (at the left in Figure 2), and an idler sprocket 14 (at the right). Holes 17 in conveyor band 16 (Figure 1) mesh with aligning and driving studs 15 on the sprockets. The upper conveying passage of the band (from idler sprocket to drive sprocket) is supported by horizontal tracks 20. The lower return passage is unsupported but performs no conveying function.

To accommodate the conveyor band to different lengths of box blanks being manufactured, the shaft supporting the idler sprocket is made adjustable away from and toward the drive sprocket, and the conveyor band may be lengthened or shortened accordingly, as described in the above patent, to maintain the band taut for any adjustment of the idler sprocket.

The conveyor band is suitably driven by counterclockwise rotation of drive sprocket shaft 12 (as viewed in Figure 2) which drives sprocket 13 keyed thereto. Shaft 12 is driven by motor 2 through drive belts 3, drive pulley 4, its hub sprocket 5, drive chain 6 and sprocket 7 which houses a clutch described in the said patent. When sprocket 7 is clutched to shaft 8, power drive is imparted through a chain of gears (not shown) to sprocket 9, to drive chain 10 and sprocket 11 keyed to drive shaft 12.

Each box blank is fabricated by joining side material parts (side sheets or slats) and cleat parts by stapling wire to the parts by stapling mechanism indicated at 100. Parts of each box blank must be properly assembled on the conveyor bands as the bands feed the parts to the stapling mechanism. To this end, spacer elements generally indicated at 21 (Figures 2 and 3) are clamped to the conveyor bands to locate each box part properly with respect to preceding and following box parts. Each box blank setup requires a number of such spacer elements. To provide continuous feeding of box parts to stapling mechanism 100, at least two, and frequently more, complete spacer element setups are required on each conveyor band so that no portion of the conveyor band is left open and unused.

The spacer elements, in addition to spacing the box parts, move them to the stapling mechanism, and so perform the dual operation of acting as spacing and aligning means and as dogs to move the parts. Because for good box-blank manufacturing the stapling mechanism sets staples to an accuracy of plus or minus one-eighth inch longitudinally of the box blank, the spacing and aligning of the parts by the spacer elements must be reliable and accurate, i. e., the elements must be clamped to the conveyor bands at accurate distance intervals and must remain so positioned. This problem is made difficult by frequent warpage and other imperfections of the box parts, which sometimes causes momentary jamming or catching of the box parts in the stapling mechanism, which catching or jamming resists forward movement of the immediate spacer elements and tends to loosen and shift the elements on the bands and to destroy the bands as will be described.

The present invention to a large measure overcomes such problems caused by jamming or catching of the box parts, provides more secure clamping of the elements to the conveyor bands, and eliminates tendency for the clamping action to destroy the bands.

Each spacer element 21 comprises a base 21a which carries box-part spacing, moving and aligning members 28, 29 and 30. Each base 21a has a downwardly extending guiding part 31 notched at 22 to receive one edge 18 of conveyor band 16 as shown in Figure 3. The other side of base 21a has a threaded hole 32 to receive clamp screw 25, which passes through an enlarged hole in clamp member 23 to pull clamp member 23 to the base. Clamp member 23 is recessed at 24 to receive edge 19 of conveyor band 16, and to provide a fulcrum 33 causing clamp member 23 to pivot thereabout as clamp screw 25 is tightened, to detachably clamp conveyor band 16 between notches 22 and 24. Lower inside surfaces of guide portion 31 and clamp member 23 serve to keep conveyor band 16 laterally aligned with respect to track 20 on which band 16 travels.

The member 28 of spacer element 21 serves to space and feed side material parts to the stapling mechanism. Member 29 serves to space and feed cleat parts to the stapling mechanism. Member 30 serves to align laterally the cleats.

To prevent turning of the spacer element about its clamping points by box parts pushing against members 28 and 29 when the parts jam or catch, a bar 34 is mounted on the underside of base 21a. The bar extends rearwardly and forwardly therefrom and by its extensive contact with the upper surface of the conveyor band provides leverage to resist turning of the spacer element, and so eliminates severe denting of the band that would otherwise be caused by turning motion of the spacer element.

It was found that the above-described clamping action of the spacer element in combination with the flat conveyor bands shown in Patent No. 2,304,510, caused occasional and apparently unexplained breakage of the conveyor bands; and that the spacer elements were from time to time moved out of their correct position even though clamping screws 25 were not loosened. For years these problems existed until solved by the present invention.

It has now been discovered that if the conveyor band under the influence of the clamping action is always bowed outwardly as shown in Figure 3 so that its outer surface contacts the under surface of base 21a along the area marked D, a positive and secure clamping of the spacer element to the conveyor band is obtained. Contact of the conveyor band with the under side of base 21a positively limits the amount of outward buckling of the conveyor band and permits the clamping action to put the conveyor band under considerable compressive stress without further straining the band. It was further discovered that with flat conveyor bands such as disclosed in said patent, there was no assurance that the conveyor band under the clamping action would buckle toward the under surface of base 21a: that it frequently buckled inwardly, i. e., away from the under surface of base 21a. It was also discovered that even though the flat band as initially clamped, buckled against the under surface of base 21a, the action of the bar 34 in resisting turning motion of the spacer element would cause the conveyor band to snap through to an inward buckling position. Such action in some instances gave the conveyor band a set thereafter tending to cause it to buckle inwardly away from base 21a. It was discovered also that if initial clamping action caused the band to buckle inwardly, it thereafter had a set, tending to cause it to buckle inwardly.

Any inward buckling of the conveyor band, it was found, had among others three pronounced disadvantages. When buckling inwardly the compressive forces clamping the spacer element to the conveying band are partially relieved by the yielding spring action of the conveyor band, thereby eliminating possibility of tight clamping and permitting the spacer element to be shifted along the conveyor band in the event of jamming or catching of the box parts.

A second disadvantage was found to be that if the conveyor band were in a condition of inward buckling as it travelled, for example, from the idler sprocket to the part E where the conveyor band bends downwardly after passing through the stapling mechanism, the conveyor band was caused to change its direction of buckle, i. e., was caused to buckle outwardly as it flexed over such part. And if the conveyor band had been given an inward buckling set by the initial clamping action, or by the action of the bar 34, then as the conveyor band straightened out after leaving the part E on its way to sprocket 13, the conveyor band would snap through to its inward buckling condition only to be returned again to an outward buckling as it flexed over the sprocket 13. Such intermittent flexing of the conveyor band between inward and outward buckling positions, and vice versa, resulted in weakening the conveyor band which in many instances caused the conveyor band to break prematurely.

A third disadvantage is that when the conveyor band buckles inwardly while traveling along track 20, it raises the edges of the conveyor band above track 20 and likewise raises elements clamped to the edges. Inasmuch as elements for controlling part of the operation of the stapling mechanism machinery are clamped to the conveyor bands, unpredictable inward buckling of the conveyor bands moved such control elements out of alignment with respect to coacting mechanism, thereby rendering the controls inoperative at times.

Breakage of conveyor bands and misalignment of the spacer elements is a serious problem in that it causes shut down of box-blank making machines reducing the overall efficiency and raising cost of operation.

It has now been discovered that by pre-forming the conveyor band to give it a pre-set outward bow, the above difficulties are eliminated. The clamping action on the edges of such a pre-formed band always causes the conveyor band to buckle outwardly against the under surface of the spacer element and eliminates any tendency for the conveyor band to buckle inwardly away from base 21a. Thus, the damaging flexing action of going from an outward buckle to an inward buckle, and vice versa, is eliminated, and loosening of the strong clamping action of the spacer element to the conveyor band is eliminated.

I have discovered that pre-forming the metal conveyor band as shown in Figure 3 to provide beveled edge portions 18 and 19, sloping inwardly when the band is stretched about the sprockets, causes the band when clamped as above described always to buckle outwardly against base 21a. In operation, the outward buckle persists even under conditions when jamming or catching of the box parts would otherwise cause the band to buckle inwardly.

By beveling the edges rather than arching the band across its width, the amount that the band is pre-set out of its plane to obtain the controlled buckling action is reduced. Thus, it has been found that using a band of .70–.80 carbon spring steel, 1.75″ wide, cold-rolled to 42 thousandths inch thick and heat treated to a Rockwell hardness of "C" 45–50, and forming bevels by bending each edge fifteen thousandths down from the plane of the band from lines F $\frac{5}{16}$″ in from the edge, gives a band that performs satisfactorily as above described. The beveled edges are conveniently formed by cold rolling the band between a forming roller shaped to the outer surface of the band (the arched surface) and a plain working roller with rounded edges having a width equal to the distance between the lines F defining the beginning of the bevels. Such pre-forming leaves the central area of the band flat and unstrained.

Whereas such pre-shaping of the conveyor band is sufficient to accomplish results desired, it does not set up destructive strains in the band as it contacts and leaves the sprockets. The buckling produced by the clamping action is largely concentrated in the areas where the beveled edge portions join the flat central portion, and does not concentrate strain in the central portion of the band (in the vicinity of the aligning and guiding holes 17) which portion is pressed almost flat against the base 21a. This is advantageous because the presence of the holes weakens the band along its central portion, and strain concentrated in this area may be highly destructive of the band.

Referring now to Figure 2, pre-formed conveyor band 16 when assembled on the machine is placed upon the support track 20 with its shallow beveled edges 18 and 19 projecting downwardly (Figure 3) and is trained over the faces of drive sprocket 13 and idler sprocket 14 and made continuous by securely clamping together its free ends in the manner disclosed in said patent.

With the conveyor band 16 completely assembled and brought up taut, the spacer elements 21 are secured thereon at predetermined spaced points to space the box or crate parts to produce a box or crate blank of a specific design. Slot 22 of each spacer element is hooked over one downwardly-projecting beveled edge 18, with the under surface of base 21a resting on the flat central portion of conveyor band 16.

The recessed portion 24 of clamp 23 is then placed over the opposite beveled edge 19, and clamp screw 25 is threaded into base 21a. Continued threading of clamp screw 25 into base 21a urges clamp 23 against base 21a at fulcrum 33 forcing clamp 23 to pivot thereabout and to move against the conveyor band. This clamping action against the edges of pre-formed steel band 16, causes its central flat portion to be uniformly and dependably forced against the under surface of base 21a, which resists further bending and permits strong clamping action, without subjecting the central portion of the band to damaging localized strain.

Since many embodiments might be made of the present invention and since many changes might be made in the embodiment disclosed herein, it is to be understood that the foregoing description is to be interpreted as illustrative only and not in a limiting sense.

I claim:

1. In a box and crate making machine of the type wherein properly arranged box parts are conveyed past a stapling mechanism by which they are stapled together to form box units, means for conveying said box parts comprising at least two pairs of spaced sprockets, and endless conveyor band trained about each of said pairs of sprockets, each of such conveyor bands comprising a flexible metal strip having in cross-section a substantially flat central portion and edge portions extending inwardly at an obtuse angle from said central portion and spacer elements for engaging said box parts, said spacer elements being clamped to said bands by portions engaging the opposite edges thereof.

2. In a box and crate making machine of the type wherein properly arranged box parts are conveyed past a stapling mechanism by which they are stapled together to form box units, means for conveying said box parts comprising at least two pairs of spaced sprockets, an endless conveyor band trained about each of said pairs of sprockets, each of such conveyor bands comprising a flexible metal strip of generally concavo-convex cross-sectional shape, and spacer elements for engaging said box parts, said spacer elements being clamped to said conveyor bands by forcible engagement with the opposite edges thereof.

CHARLES O. RIKER.

REFERENCES CITED

The following references are of record in the file of this patent:

UNITED STATES PATENTS

| Number | Name | Date |
|---|---|---|
| 499,472 | Robins | June 13, 1893 |
| 2,055,932 | Kitchen | Dec. 1, 1933 |
| 2,304,510 | Rosenmund | Dec. 8, 1942 |